Figure 1:
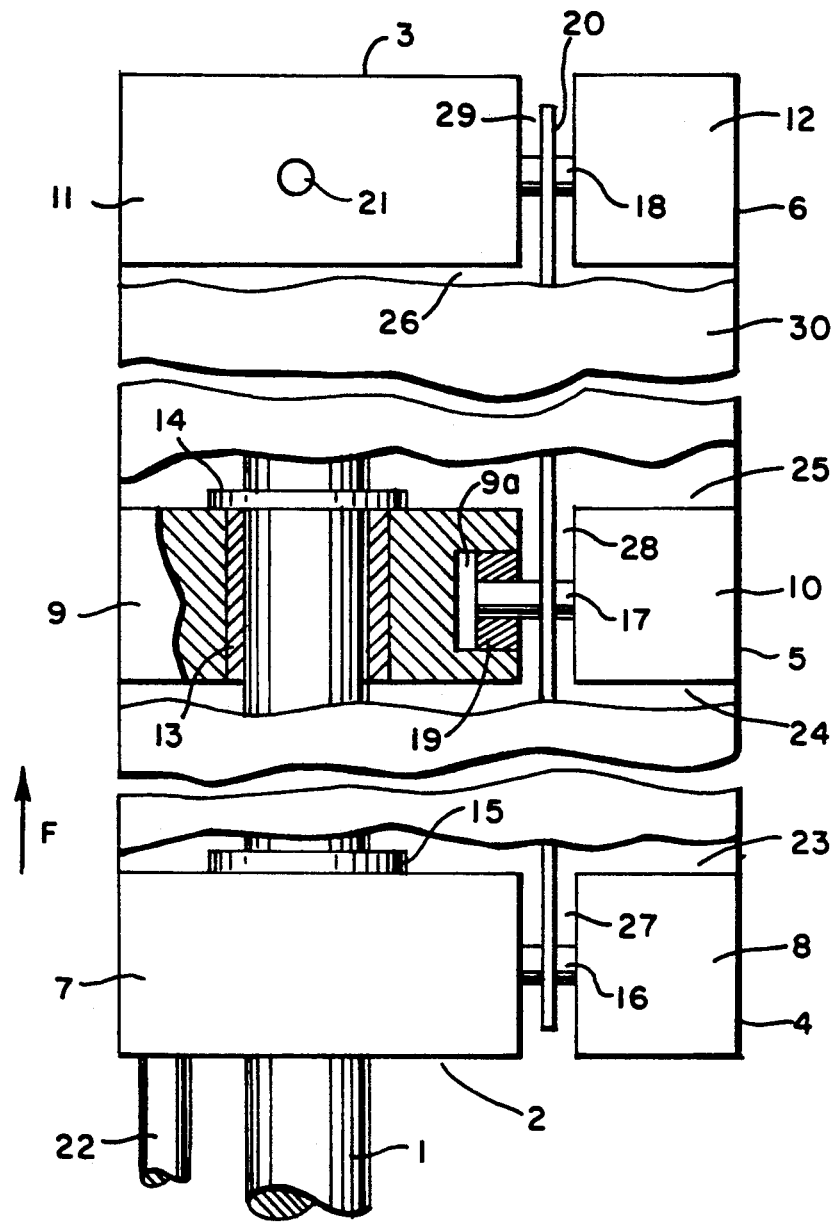

United States Patent [19]
Lutz

[11] Patent Number: 5,284,419
[45] Date of Patent: Feb. 8, 1994

[54] PROPELLER WITH BLADES WHICH CAN BE TWISTED

[76] Inventor: Ferdinand Lutz, 534 Bad Honnef, Frankenweg 24, Fed. Rep. of Germany

[21] Appl. No.: 927,388

[22] PCT Filed: Apr. 1, 1991

[86] PCT No.: PCT/EP91/00612

§ 371 Date: Sep. 23, 1992

§ 102(e) Date: Sep. 23, 1992

[87] PCT Pub. No.: WO91/15399

PCT Pub. Date: Oct. 17, 1991

[30] Foreign Application Priority Data

Mar. 30, 1990 [DE] Fed. Rep. of Germany ....... 4010211

[51] Int. Cl.⁵ ................................ F03D 3/06
[52] U.S. Cl. ................................ 416/132 R
[58] Field of Search .......... 416/132 R, 141, 240, 416/223 R

[56] References Cited

U.S. PATENT DOCUMENTS

| | | | |
|---|---|---|---|
| 2,055,928 | 9/1936 | Hays | 416/132 |
| 2,244,139 | 6/1941 | Buckingham | |
| 2,369,049 | 2/1945 | Hays | 416/132 |
| 2,584,663 | 2/1952 | Bensen | |
| 2,627,928 | 2/1953 | Mullgardt | |
| 2,978,039 | 4/1961 | Focke | 416/132 |
| 3,096,826 | 7/1963 | Amer et al. | 416/132 |
| 3,227,221 | 1/1966 | You | 416/132 |
| 3,637,168 | 1/1972 | Ryan et al. | 416/132 |
| 4,137,010 | 1/1979 | Stroub | 416/132 |
| 4,619,585 | 10/1986 | Storm | 416/132 |

FOREIGN PATENT DOCUMENTS

| | | | |
|---|---|---|---|
| 1281271 | 10/1968 | Fed. Rep. of Germany | |
| 1531475 | 5/1970 | Fed. Rep. of Germany | |
| 1531476 | 7/1970 | Fed. Rep. of Germany | |
| 2164648 | 6/1973 | Fed. Rep. of Germany | |
| 752142 | 9/1933 | France | |
| 557300 | 10/1977 | U.S.S.R. | 416/132 |
| 606784 | 8/1948 | United Kingdom | 416/132 |

Primary Examiner—John T. Kwon
Attorney, Agent, or Firm—Body, Vickers & Daniels

[57] ABSTRACT

Propeller with twistable blades comprising a spar with ribs which can be rotated in opposite directions about the axis of the spar by an adjusting device. A coupling device in the propeller ensures that when two ribs are rotated in opposite directions by the adjusting device, the other ribs are adjusted accordingly. The coupling device consists of a rod substantially parallel to the spar and designed to be relatively bendable in the plane through the spar and the rod, and relatively resistant to bending in the plane perpendicular thereto. The rod couples at least three ribs together in such a way that it distorts when two ribs are rotated in opposite directions along a helix about the spar, causing subsequent ribs to move with it on this helix.

31 Claims, 3 Drawing Sheets

PROPELLER WITH BLADES WHICH CAN BE TWISTED

The invention relates to a propeller with blades which can be twisted.

If a propeller is operated for producing the forward-drive force of an aircraft, optimum blade pitch angles can be maintained over the entire blade length in different flight situations (takeoff, climbing flight, cruise flight) in the case of a propeller with blades which can be twisted, with the advantage of a thrust and efficiency which are favourable in each case for these different flight situations, and as little noise generation as possible. When using a propeller with blades which can be twisted in so-called VTOL aircraft, the propeller is used as a rotor in hovering flight, in a position pivoted through 90 angular degrees with respect to that in cruise flight. A variable blade twist makes possible an optimum blade pitch angle over the entire blade length in such a case as well, both in the different phases of forward flight and in the hovering flight phase, in contrast to a propeller with a rigid blade twist which has an optimum setting with the most favourable thrust and efficiency and as little noise generation as possible only in a single operating situation which is predetermined by the design point.

Design solutions for a propeller with blades which can be twisted have been proposed many times. For example, DE-OS 2,164,648 discloses the facilitating of a variable twist of the blade via a strip system within the propeller blade in conjunction with a rigid main spar and conical adjusting tubes resting thereon. DE-OS 1,531,475 and DE-AS 1,531,476 describe a propeller having a variable blade twist, in which the twist is achieved by means of ribs which are guided on a spar in helical grooves and can be displaced axially on the spar. According to DE-AS 1,281,271, blade cavities can be rotated around the blade axis by means of a different fluid filling, as a result of which it is intended to facilitate a variable blade twist.

Disadvantages of the known design proposals for the construction of a propeller with blades which can be twisted are the suitability, which is only limited, for operation under high centrifugal-force stresses and, furthermore, the highly complex blade construction.

A propeller of the type mentioned initially has been disclosed in U.S. Pat. No. 2,627,928. The individual ribs which are arranged on the blade spar such that they can rotate are connected at the leading edge of the blade to in each case one reinforcing element and at the trailing edge to in each case one leaf spring element. During an adjustment process of the outermost rib with respect to the innermost rib, the intermediate ribs are also moved by the elastic outer skin enclosing the blade. Since, in particular, the leaf spring elements form a type of chain which deforms in an unpredictable manner under the influence of the centrifugal force, bending and torsion oscillations occur in operation which negate the advantages of the adjustment capability again.

A further example for a propeller of the type mentioned initially is specified in U.S. Pat. No. 2,584,663. There it is intended to force a rotation of the ribs with respect to one another and hence a twisting of the propeller blade by means of two rod elements which run parallel to the spar and connect the individual ribs which can rotate around the spar to one another, when the innermost rib is rotated with respect to the spar which is firmly connected to the blade tip. Fixing of the rod elements to the ribs takes place with a predetermined twisting of the propeller blade. If necessary, in the case of such a design configuration, a change in the twist with respect to the predetermined value results in torsion and bending of these rod elements and of the ribs; the twisting of the blade thus demands a twisting of the grid structure given by the rod elements and ribs which is basically stiff but, if necessary, is somewhat elastic, and hence necessitates high adjusting forces. The fundamental disadvantages of the known solutions, specifically the possibility of bending and torsional oscillations especially in the case of high centrifugal forces, as well as a complex construction and high adjusting forces, thus also characterise this example.

The object of the invention is to create a propeller of the type mentioned initially in which, on the one hand, the high centrifugal-force stresses of the blade are adequately absorbed despite the elastic regions which are required for variability of the twist, and in which, in particular, the coupling between adjacent ribs takes place such that an undesired adjustment of the elastic regions under the influence of the centrifugal force and an undesired adjustment of the blade geometry resulting from this are prevented, with a simple blade construction.

As a result of the connection, according to the invention, of the ribs which are arranged on the spar such that they can rotate with the aid of one or more rod elements which engage over in each case at least three ribs and are connected to one another and is or are designed to be soft in bending in the plane which is fixed by the spar and the rod element and, in contrast, comparatively stiff in bending in the plane at right angles thereto, a structurally very simple basic structure of a propeller blade which can be twisted is obtained in an advantageous manner. The rod element designed and constructed according to the invention is deformed along a helical line when two ribs are rotated relative to one another by the application of external force, all the ribs being rotated on the spar by the rod element or rod elements such that a continuous twisting of the basic blade structure given by the ribs takes place.

In accordance with a specific feature of the invention, the ribs may be adjusted. The essential feature is that two ribs which are covered by one rod element are adjusted with respect to one another. The inner rib, which is located at the blade root, and the outer rib, which is arranged at the blade tip, are rotated with respect to one another in a particularly advantageous manner; the other ribs are forced into the desired intermediate positions by the rod element or by the rod elements.

A further feature of the invention relates to the connecting points of the ribs to a rod element. As a result of this construction of the connecting points of the ribs to a rod element, in such a manner that the rod element can be displaced with respect to the ribs within a structurally predetermined play along the rod element longitudinal axis, no tension or compression force acts on the rod element, in an advantageous manner, when two ribs are rotated with respect to one another. It is ensured in an advantageous manner by virtue of this design and by the fixing of the ribs with respect to lateral displacement on the bar that the centrifugal forces acting on the ribs during operation of the propeller do not need to be absorbed by the rod element, and that the influence of the centrifugal forces on the rod element, and thus directly on the adjusting device, is hence advantageously small.

In such a design, when blade twisting takes place between two adjacent ribs, small height jumps necessarily occur on the blade surface which increase from the spar in the direction of the blade profile nose or blade trailing edge. These height jumps can be equalised in a particularly advantageous manner by constructing the ribs which are arranged on the spar in a torsionally-soft manner around the ribs' longitudinal axis and are simultaneously twisted around their rib longitudinal axis when the ribs are adjusted.

One preferred configuration of the invention may consist in that the ribs are split into rib segments which can be rotated with respect to one another around the longitudinal axis of the ribs running at right angles to the spar. In consequence, it is achieved that the ribs can match themselves better to the twist so that the height jumps which have been referred to between the ribs during blade twisting advantageously become negligibly small. This matching of the individual rib segments to the blade twist can take place by a non-rotatable mechanical connection of rib sections to a rod element allocated to them or, as well, by the force effect of an elastic layer enveloping the propeller blade or, by filling the intermediate spaces between the ribs with a viscous-elastic material.

Figure 2:
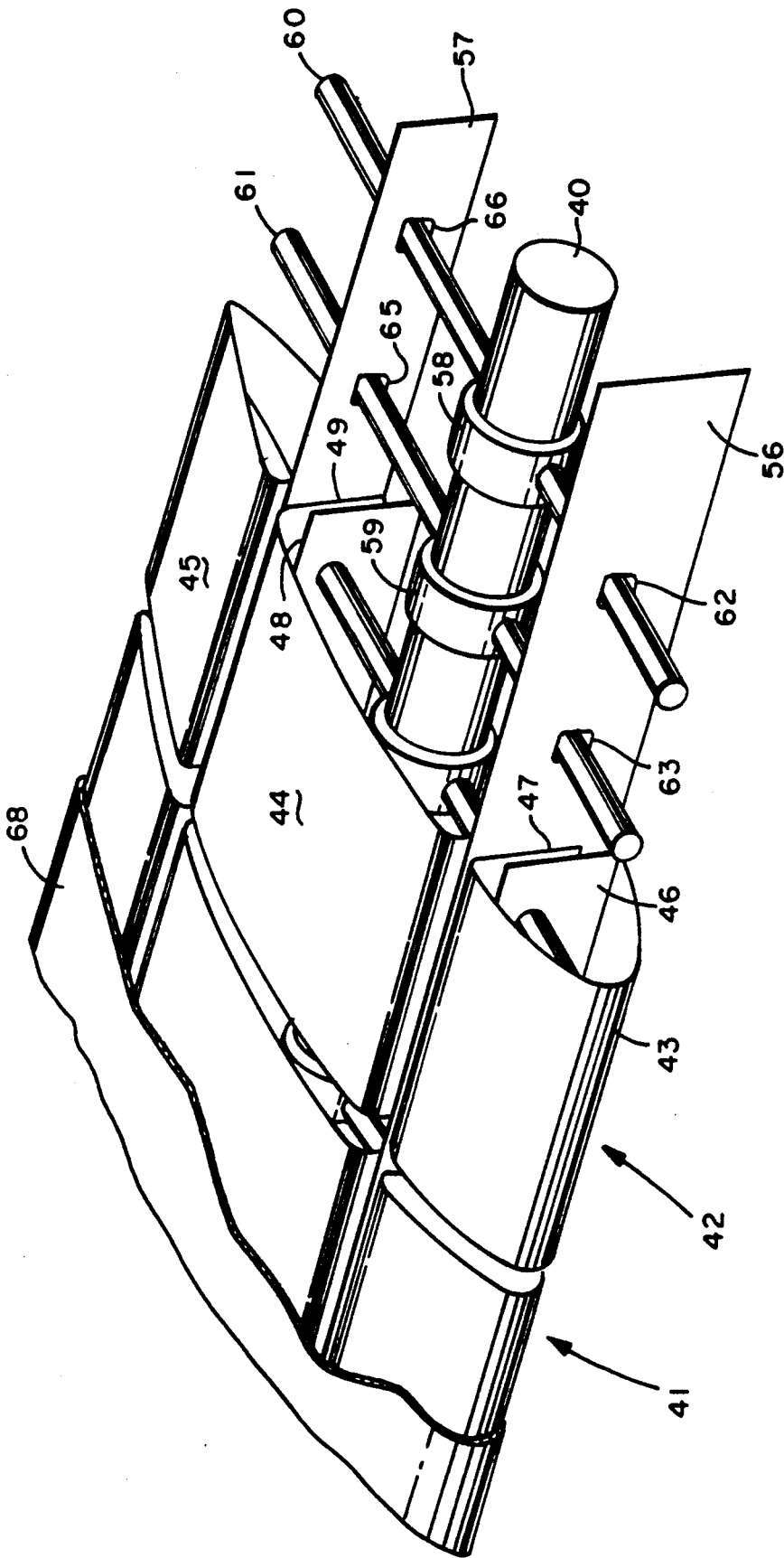
Figure 3:
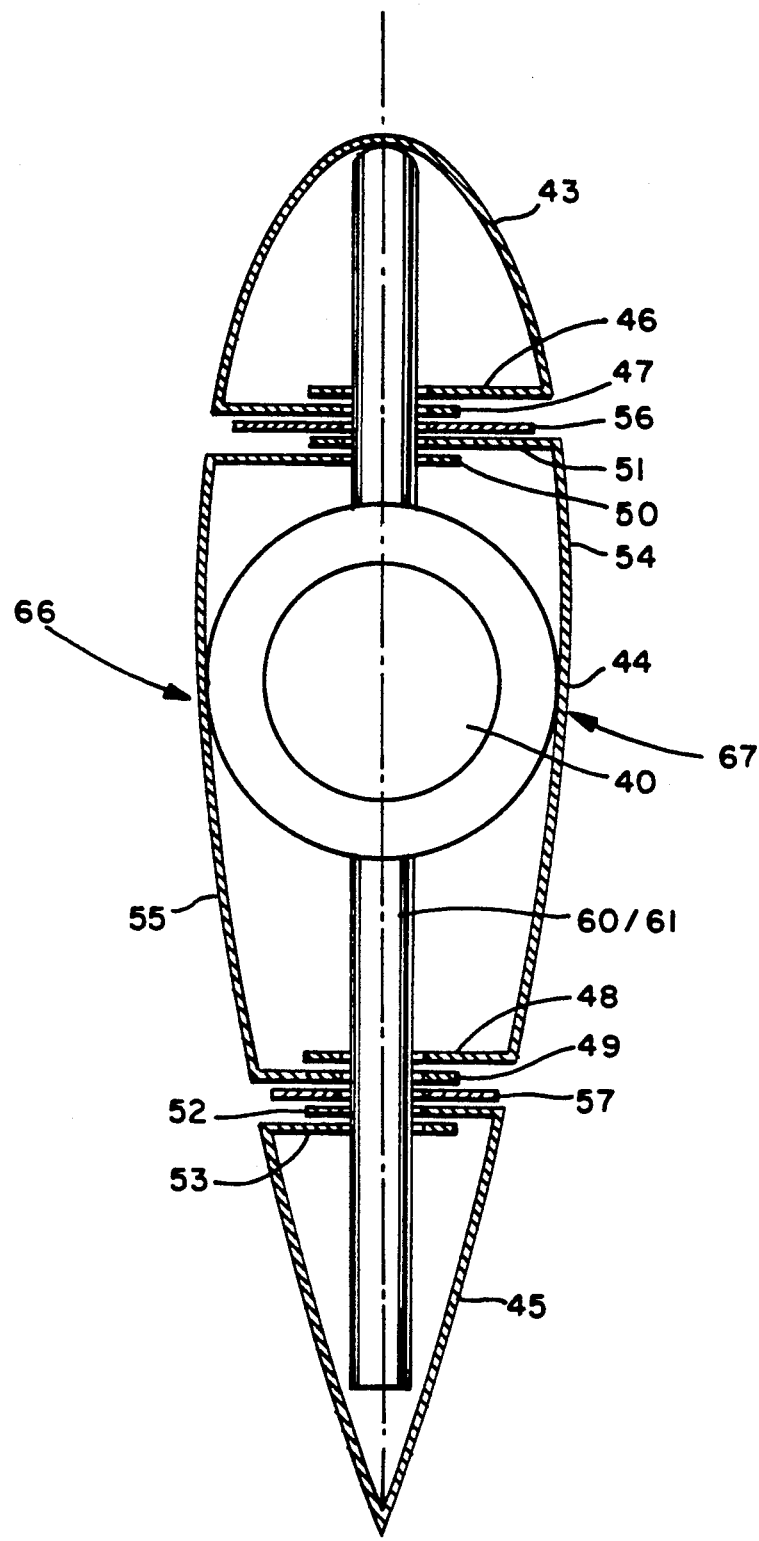

The rotation of the rib segments with respect to one another, that is to say the twisting of the individual ribs, can also be produced advantageously if the ribs with the adjusting device are constructed according to the characterising features according to FIGS. 2 and 3.

As a result of this design, according to the invention, of the adjusting device in such a manner that torsion of the individual ribs also takes place at the same time as the blade twisting, a continuous blade surface without large height jumps is advantageously achieved in a comparatively simple manner. By means of at least two engagement points, lying side-by-side, of the adjusting device, at which a slightly different rotation of the rib with respect to the spar is introduced, the torsion of the ribs can be achieved comparatively easily. According to the invention, elements which are suitably matched to the profile contour, are formed flat and consist of a non-elastic material can be used as the basic structure of the ribs, as a result of which, on the one hand, the high centrifugal forces of a rotating propeller blade can be coped with advantageously and, on the other hand, the required twisting capability in a small circumference is given. In order to increase the flexibility which is required for the twisting capability, according to the invention, slots can be incorporated into the elements. If necessary, these elements can be supported at one or more points against deforming forces and forces which change the profile contour. In one particularly advantageous configuration of the invention, there are a plurality of rib rods per rib which can rotate on the spar, and run in the rib longitudinal axis, that is to say at right angles to the spar, support the elements following the profile contour on one side, the adjusting device, that is to say the rod elements, engaging on the other side, the rotation introduced in two adjacent rib rods of one rib differing slightly so that, in consequence, torsioning of the ribs takes place at the same time. Two rod elements expediently run parallel to the spar, to be precise on the blade leading edge side and the blade trailing side, so that the engagement points are arranged on both sides of the spar. The rib rods are supported on the spar by means of bearing rings such that they can rotate, these bearing rings can then be constructed such that they are used for supporting the elements against the deforming forces and forces which change the profile contour.

Using the drawing, in which two configurations of the invention are shown, it is intended to explain and describe the invention as well as further advantageous configurations and improvements and further advantages, in more detail.

FIG. 1 shows a partially cut-away view of a first configuration of a propeller according to the invention, FIG. 2 shows a perspective partial view of a second configuration of a propeller and FIG. 3 shows a section view along the section line III—III in FIG. 2.

Reference is now made to FIG. 1.

FIG. 1 shows a part of a propeller according to the invention. It has a spar 1, which is stiff in torsion and bending, is resistant to tension and is of cylindrical construction, on which ribs 4, 5 and 6 are arranged, from the blade root 2 to the blade tip 3, such that they can rotate around the spar. Each of these ribs is constructed from rib segments 7, 8; 9, 10; 11, 12, the first rib segment 7, 9, 11 of each rib being supported in a sleeve 13 (see rib segment 9) on the spar 1 such that it can rotate around its axis. Furthermore mounted on the spar are rings 14, 15 by means of which the first rib segment is secured against lateral displacement on the spar 1 as a consequence of the centrifugal force occurring in operation, which acts in the direction of the arrow F. The second rib segment 8, 10, 12 of each rib is connected to the first rib segment 7, 9, 11 in each case by means of a cylindrical bolt 16, 17, 18.

Within the end section averted from the spar, each rib segment 7, 9, 11 has a depression, of which only the depression 9a of the rib segment 9 can be seen. Sleeves 19, in which the bolts 16, 17 and 18 are supported such that they can rotate, are inserted into these depressions 9a. Since the second rib segments 8, 10, 12 are firmly connected to the bolts 16, 17, 18, the second rib segments 8, 10, 12 are connected to the front rib sections 7, 9, 11 by the bolts 16 to 18, such that they can rotate.

The three ribs 4, 5 and 6 are covered by a rod element 20 which runs parallel to the spar 1 on its side facing the blade trailing edge. The rod element 20 is connected to the ribs 4, 5 and 6 in each case in the region of the bolts 16 to 18, the bolts 16, 17, 18 in each case passing through elongated holes in the rod element 20, which cannot be seen in FIG. 1. The rod element 20 is designed as a flat strip with an elongated rectangular cross-section, such as the corresponding rod element of the configuration according to FIGS. 2 and 3, and can be seen only with its narrow side in FIG. 1. Because of its cross-sectional shape according to the invention, it bends in a soft manner within the plane which is fixed by the propeller blade and in a stiff bending manner in the plane at right angles thereto. In other words, it can easily be bent around an axis running at right angles to the plane of the drawing and has a low bending stiffness here while, on the other hand, it has a high bending stiffness around an axis which lies in the plane of the drawing, corresponds to the rotation axes of the bolts 17 and is aligned at right angles to the longitudinal axis of the spar.

The bolts 16, 17 and 18 are expediently constructed to be rectangular in cross-section, to be precise in the region in which they are guided through the elongated hole in the rod element 20. In consequence, a rotation-free mechanical connection is achieved between the rod element 20 and the second rib segments 8, 10 and 12.

The outer rib 6, arranged at the blade tip 3, is fixed on the spar 1, such that it cannot rotate, by means of a pin 21 which passes through the rib segment 11 and the spar 1 at right angles. The inner rib 4, arranged at the blade root 2, can rotate with respect to the spar 1 via an adjusting device of which FIG. 1 shows only a peg 22 which transmits the adjusting force and is firmly connected to the first rib segment 7 of the rib 4. The intermediate spaces 23, 24, 25 and 26 located between the ribs 4 and 6, as well as the intermediate spaces 27 to 29 between the first and the second rib segments are advantageously filled with elastic material while, on the other hand, the rib segments themselves consist of hard material which does not deform elastically, or deforms only slightly, even under the influence of high centrifugal forces.

The propeller blade is surrounded by an elastic, thin layer 30 which rests on the ribs 4 to 6 and the rib segments 7 to 12.

A further configuration of the invention can be found in FIG. 2 and 3.

A propeller blade according to FIG. 2 has a spar 40, which is stiff in torsion and bending, on which the ribs 41, 42 are supported such that they can rotate. Each of these ribs has flat elements 43, 44, 45, which are formed corresponding to the profile contour and of which the element 43 forms the blade nose and the element 45 the blade trailing edge of the propeller blade. The elements 43 and 45 are accordingly formed like a box in a virtually closed manner, their inner walls facing the spar being formed by overlapping the ends 46, 47 and 52, 53 respectively of the flat elements 43, 45. The central element 44 is assembled from two U-shaped subelements 54 and 55, whose limbs 48, 49 and 50, 51 respectively likewise overlap and in consequence the two elements 54 and 55 form a closed box. Two rod elements 56 and 57 according to the invention and running parallel to the spar 40 are used as the adjusting device for rotating the ribs 41, 42 on the spar 40.

Each rib 41, 42 has two rib rods 60, 61 which are arranged side-by-side, run in the rib longitudinal axis and at right angles to the spar 40 and are in each case connected firmly to a bearing ring 58, 59, by means of which they are supported on the spar 40 such that they can rotate. The bearing rings 58 and 59 surround the spar 40. The rod elements 56 and 57 which run on both sides of the spar and parallel thereto, and are constructed and arranged in a similar manner as the rod element 20 in FIG. 1, are passed through by the rib rods 60, 61, the rod elements 56 and 57 having elongated holes 62, 63 and 64 and 65 respectively which permit a certain movement of the rod elements 56 and 57 with respect to the rib rods 60 and 61 when the blade twist is being changed.

The individual ribs 41, 42 are twisted around their rib longitudinal axis via the two rib rods 60 and 61. In other words, the rod elements 56, 57 are connected to the rib rods 60, 61 via the elongated holes 62, 63; 64, 65 and introduce the adjusting forces to the rib rods and hence to the ribs.

The rib rods 60, 61 run through the mutually overlapping ends of the elements 43, 44, 45 so that the elements 43 to 45 are also connected to the rib rods 60, 61.

When said rib rods are rotated differently on the spar 40 from the rod elements 56 and 57 such that the rod elements 56, 57 set themselves on a helical line and the rib rods 60, 61 have to follow this adjustment, the elements 43 to 45, which are used as rib segments, rotate with respect to one another and intrinsically so that a smooth overall surface is formed. The subelements 54 and 55 are supported at two points 66, 67 on the bearing rings 59, 58 against externally acting forces which change the profile contour. The propeller blade is surrounded by a thin elastic layer 68 resting on the elements 43 to 45 (see FIG. 2).

I claim:

1. Propeller with blades which can be twisted, comprising a spar on which ribs are arranged which can be rotated with respect to one another around the axis of the spar by means of an adjusting device, and having at least one rod element running parallel to the spar which also forcibly adjusts the other ribs, as a coupling means, when the two ribs are rotated with respect to one another by the adjusting device, characterised in that the rod element is designed to be comparatively soft in bending in the plane fixed by the spar and the rod element, and comparatively stiff in bending in the plane at right angles thereto, and couples at least three ribs to one another in such a manner that the at least one rod element deforms about the spar along a helical line 25. Propeller according to claim 11, wherein the flat rib elements which follow the profile contour are mechanically connected to the rib rods.

26. Propeller according to claim 12, wherein the flat rib elements which follow the profile contour are mechanically connected to the rib rods.

27. Propeller according to claim 1, wherein said at least one rod element is constructed in the manner of a flat strip.

28. Propeller according to claim 1, wherein said ribs are constructed of multiple pieces, said pieces further comprised of rib segments, said at least one rod element located between said rib segments and coupling said rib segments to said rod segments by a coupling device which passes through holes in said rod elements.

29. Propeller according to claim 1, wherein said ribs are secured in the direction of centrifugal forces caused by rotating of said ribs around the axis of said spar, by stop rings on said spar.

30. Propeller according to claim 1, wherein said ribs are constructed of two outer rib segments and one central rib segment, said rib segments each having a hollow profile which together form a propeller profile, said spar extending through said hollow profile of said central rib segment, said rod element located between said central rib segment and one of said outer rib segments and coupled to said rib segments.

31. Propeller according to claim 1, wherein at least one said rib rod is supported such that it can rotate about said axis of said spar, said support ribs extend at right angles to said longitudinal axis of said spar and pass through holes within said rod element and within said rib segments arranged on said spar.

* * * * *